(12) United States Patent
McCleary

(10) Patent No.: US 11,425,975 B1
(45) Date of Patent: Aug. 30, 2022

(54) WALKING CANE SYSTEM AND METHOD OF USE

(71) Applicant: Thomas James McCleary, Texas City, TX (US)

(72) Inventor: Thomas James McCleary, Texas City, TX (US)

( * ) Notice: Subject to any disclaimer, the term of this patent is extended or adjusted under 35 U.S.C. 154(b) by 0 days.

(21) Appl. No.: 17/153,338

(22) Filed: Jan. 20, 2021

(51) Int. Cl.
*A45B 9/00* (2006.01)
*A45B 9/02* (2006.01)
*A45B 9/04* (2006.01)
*G05B 19/4155* (2006.01)

(52) U.S. Cl.
CPC .................. *A45B 9/02* (2013.01); *A45B 9/04* (2013.01); *G05B 19/4155* (2013.01); *A45B 2009/002* (2013.01); *A45B 2009/007* (2013.01); *G05B 2219/36169* (2013.01)

(58) Field of Classification Search
CPC .............. A61H 3/02; A61H 2003/0272; A45B 2009/002; A45B 3/00; A45B 1/00; A45B 2009/005
See application file for complete search history.

(56) References Cited

U.S. PATENT DOCUMENTS

| | | | | |
|---|---|---|---|---|
| 5,826,605 A | * | 10/1998 | Hilton | A45B 1/00 135/66 |
| 6,039,064 A | * | 3/2000 | Hilton | A45B 1/00 135/65 |
| 6,068,007 A | * | 5/2000 | Hilton | A45B 1/00 135/65 |
| 8,387,638 B2 | * | 3/2013 | Schroeder | A45B 9/00 135/66 |
| 8,490,637 B2 | * | 7/2013 | Schroeder | G05B 15/02 135/66 |
| 8,689,811 B2 | * | 4/2014 | Schroeder | G05B 15/02 135/66 |
| 9,277,794 B2 | | 3/2016 | Moreau | |
| 9,468,272 B1 | * | 10/2016 | Hyde | G01B 21/20 |
| 9,591,902 B1 | | 3/2017 | Hyde | |
| 11,116,294 B2 | * | 9/2021 | Schroeder | G05B 15/02 |
| 2016/0295978 A1 | * | 10/2016 | Hyde | G01B 21/20 |
| 2017/0055652 A1 | * | 3/2017 | Hyde | G08B 21/02 |

FOREIGN PATENT DOCUMENTS

| | | |
|---|---|---|
| JP | 2016105770 A | 6/2016 |
| KR | 101711300 B1 | 2/2017 |

* cited by examiner

*Primary Examiner* — Noah Chandler Hawk
(74) *Attorney, Agent, or Firm* — Leavitt Eldredge Law Firm

(57) ABSTRACT

A walking cane system including of a remote control device having a user interface and a first transmission system; and a walking cane having a shaft configured with a proximal end and a distal end, a handle coupled to the proximal end of the shaft, a base coupled to the distal end of the shaft, one or more elongated members housed within the shaft, a second transmission system, and a motor system; wherein the actuation of remote control device causes the walking cane to raise itself into a vertical, upright orientation.

2 Claims, 4 Drawing Sheets

WALKING CANE SYSTEM AND METHOD OF USE

BACKGROUND

1. Field of the Invention

The present invention relates generally to mobility aid systems, and more specifically to a walking cane system that allows a walking cane to raise itself from a horizontal position into a vertical, upright position.

2. Description of Related Art

Mobility aid systems are well known in the art and are effective means providing stability during user movement. Many individuals suffer from afflictions because of age, medical conditions, or the like that make simple movement, such as walking and standing, difficult if not impossible. One of the most commonly used devices in mobility aid systems are walking canes which are readily available on the commercial market. Walking canes support users in an upright orientation while walking or standing.

While walking canes are simple solutions to help individuals move safely and easily, current walking canes do not assist individuals to physically pick up the walking cane if the walking cane is laying on the ground. For example, FIG. 1 depicts a schematic of a conventional walking cane system 101. As shown, a user 103 is unable to pick up his or her walking cane 105 due to his or her affliction 107. In many situations, the user 103 may be alone and cannot readily ask someone to assist the user 103 to pick up his or her walking cane 105. Moreover, these vulnerable situations can lower the user's self-confidence in exercising common daily activities independently and can detrimentally affect his or her mental health.

Hence, it would be advantageous to have a walking cane system that provides for a walking cane capable of positioning itself in an upright, ready to use orientation thereby eliminating the need for a user to physically maneuver the walking cane into the upright, ready to use orientation. Such a system would have the ability to encourage the user to carry on common daily activities independently and positively affect his or her mental health.

Accordingly, although great strides have been made in the area of walking cane systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
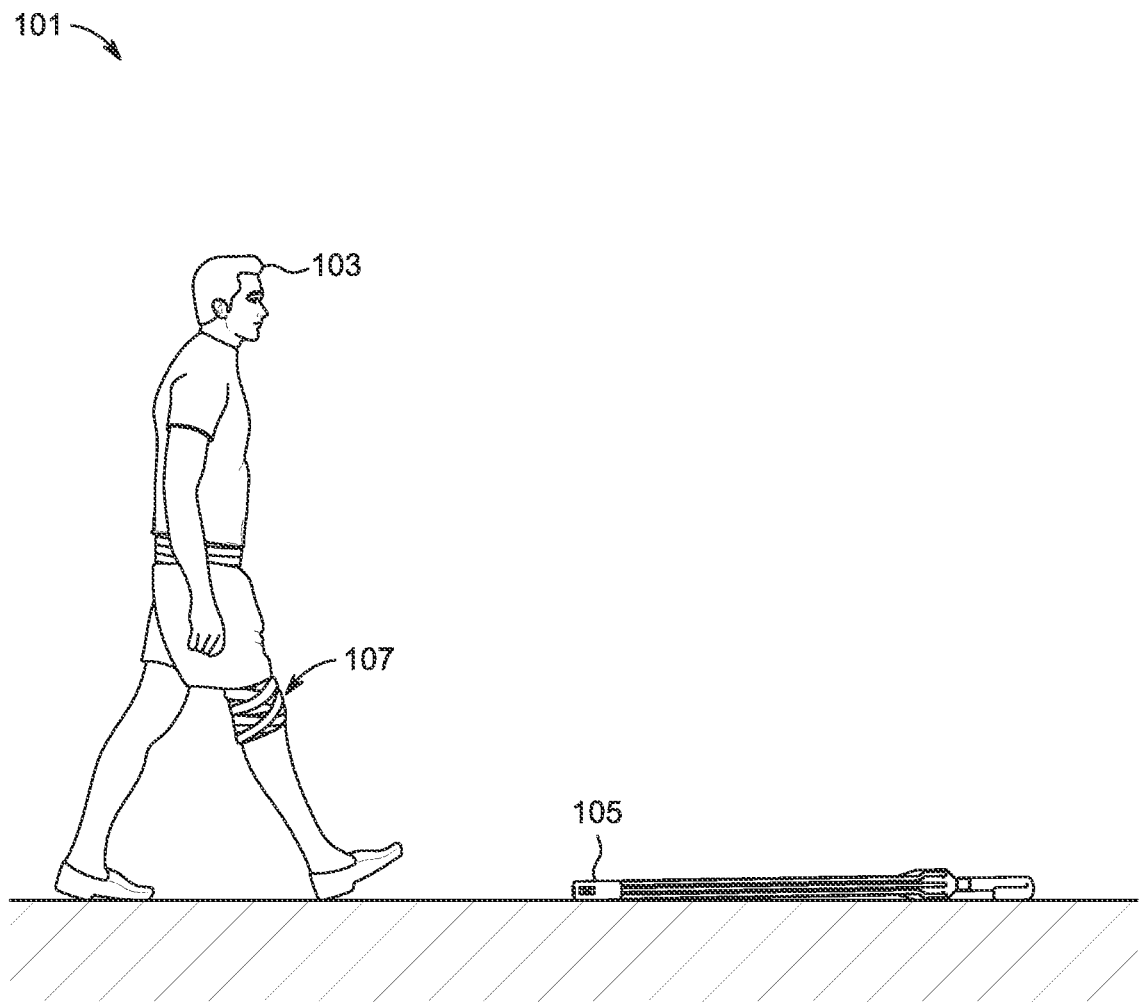
FIG. 1 is a schematic of a prior art walking cane system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional walking cane systems. Specifically, the system of the present invention provides a walking cane capable of positioning itself in an upright, ready to use orientation. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
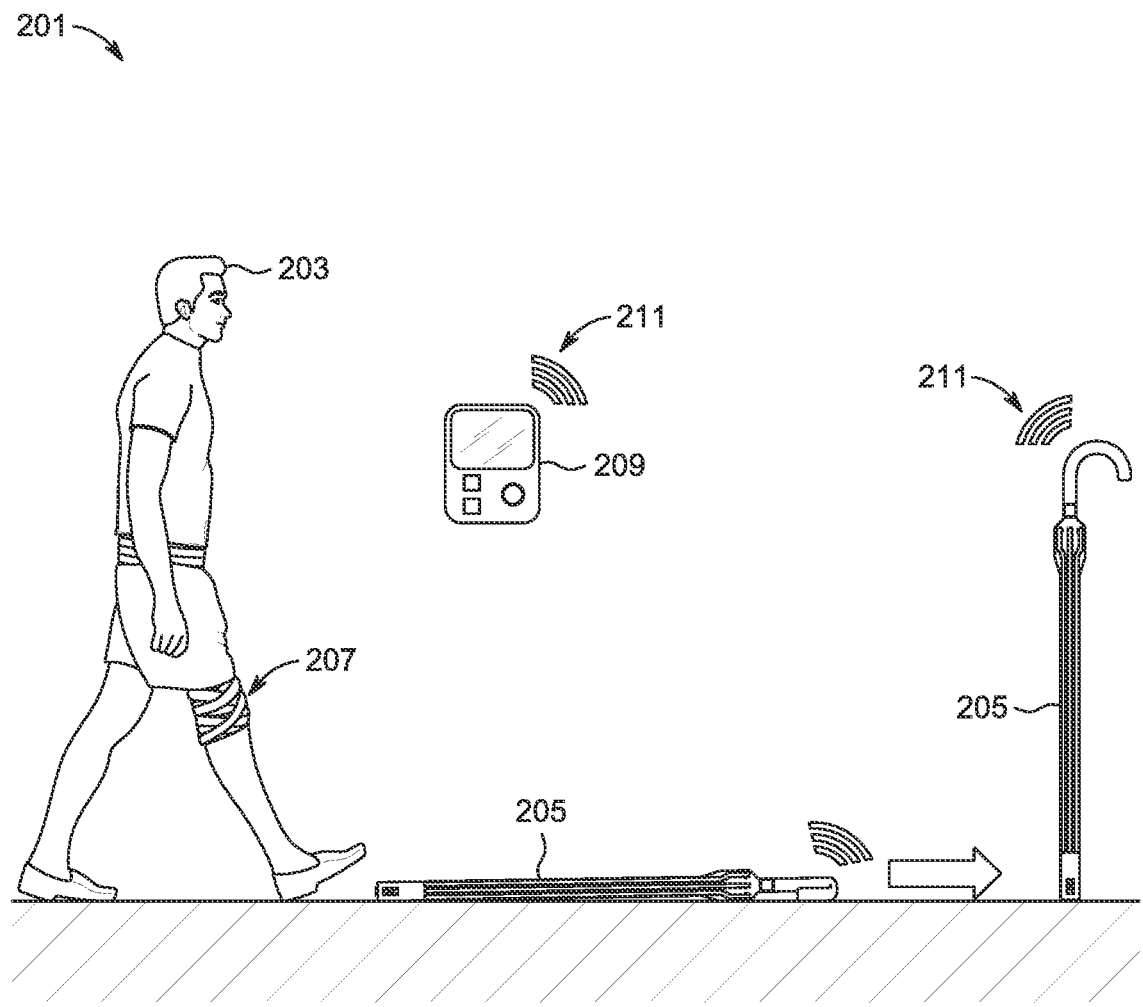
FIG. 2 is a schematic a walking cane system in accordance with a preferred embodiment of the of the present invention.

Referring now to the drawings wherein like reference characters identify corresponding or similar elements throughout the several views, FIG. 2 depicts a schematic of a walking cane system in accordance with a preferred embodiment of the present application. It will be appreciated that system 201 overcomes one or more of the above-listed problems commonly associated with conventional walking cane systems. It should be appreciated that the walking cane system 201 may vary based on aesthetical, functional, or manufacturing considerations.

In the contemplated embodiment, system 201 includes a walking cane 205 (details discussed further below in FIG. 3) and a remote control device 209. The remote control device 209 is configured to command the walking cane 205 to raise itself via a communication signal 211. It should be appreciated that the remote control device 209 may have a user interface in any suitable form, preferably a handheld device with one or more buttons, to allow the user 203 to interact with the remote control device 209. In addition, it should be appreciated that the communication signal 211 may be based on any suitable wireless communications technology including, but not limited to, radio frequency technology, infrared technology, Bluetooth® technology, Wi-Fi® technology, wireless universal serial bus technology, satellite technology, and television broadcast technology. Further, it should be appreciated that the communication signal 211 may be used for one-way or two-way transmissions between the walking cane 205 and the remote control device 209.

In some embodiments, a user 203 having one or more afflictions 207 may not be able to position the walking cane 205 in an upright, ready to use orientation. The user 203 may interact with the remote control device 209 to direct the walking cane 205 to raise itself to an upright, ready to use orientation, as depicted by the directional arrow.

Figure 3:
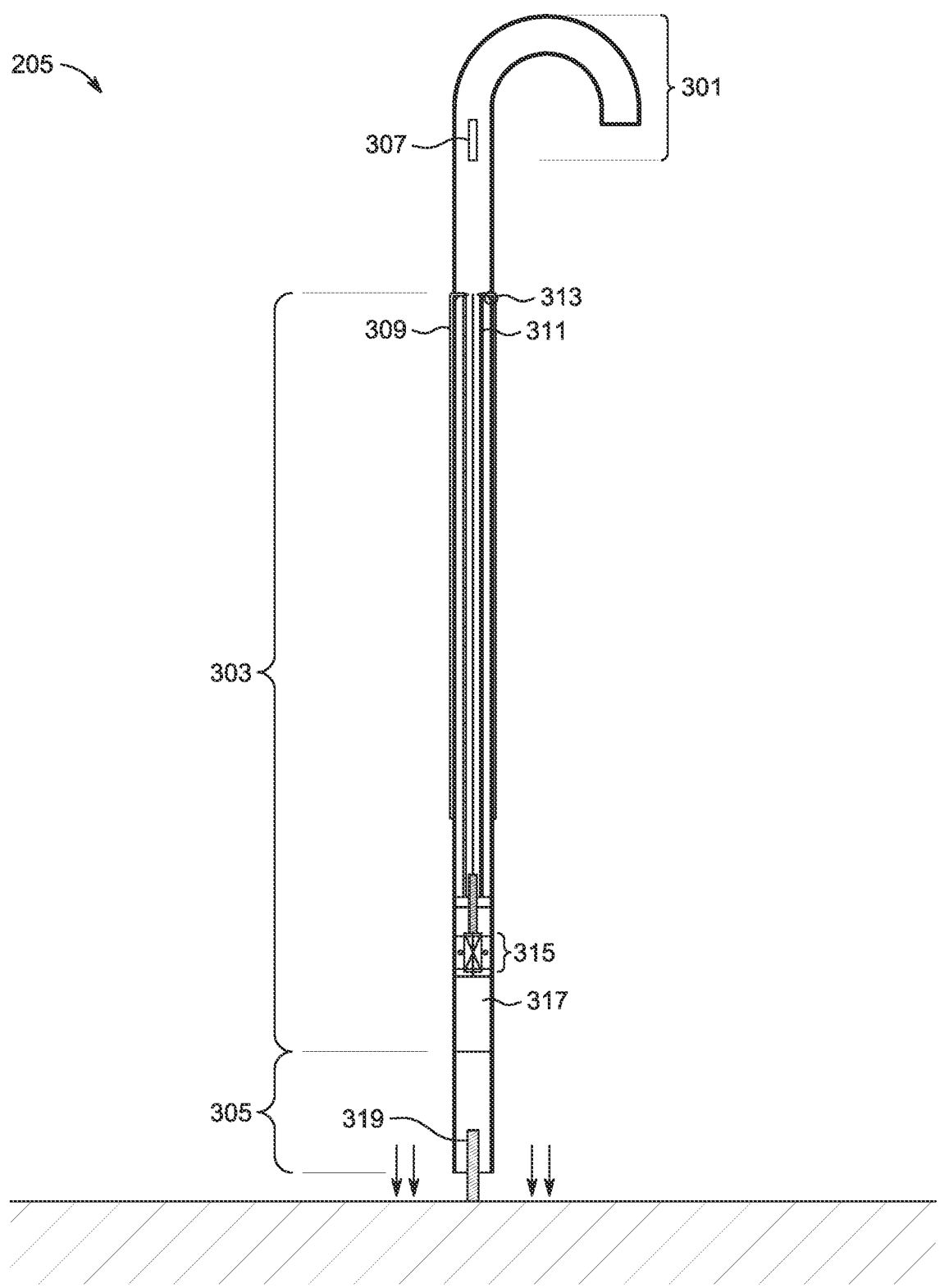
FIG. 3 is a cross-sectional view of a walking cane of the walking cane system of FIG. 2.

Referring now to FIG. 3, a cross-sectional view of a walking cane 205 is shown. The walking cane 205 comprises of a handle 301, a shaft 303, and a base 305. The handle 301 includes a switch 307 configured to activate the walking cane 205.

The shaft 303 includes one or more elongated members 309, one or more elasticized cords 311, and one or more return springs 313 therein. The elasticized cords 311 and the return springs 313 are in communication with the elongated members 309 to move the elongated members 309. The elongated members 309 are configured to push and lift the walking cane 205 from a horizontal position, i.e., laying on the ground surface, to a vertical, upright position such that the handle 301 is readily available for the user 203 to grasp onto.

The shaft 303 also includes a motor system 315 configured to drive the elongated members 309 out through the base 305. It should be appreciated that the motor system 315 may be based on any suitable technology capable of driving the elongated members 309 out through the base 305 including, but not limited to, hydraulics, spring motors, rotary drive mechanism, and electrical circuitry. In addition, it should be appreciated that although the motor system 315 is shown on the superior end of the shaft 303, it is contemplated that the motor system 315 could vary in location, size, style, and the like.

Additionally, the shaft 303 includes a power box 317 configured to supply and control electrical power throughout the walking cane 205. The power box 317 can be configured to receive and transmit communication signal 211 between the walking cane 205 and the remote control device 209. It should be appreciated that although the power box 317 is shown on the superior end of the shaft 303, it is contemplated that the power box 317 could vary in location, size, style, and the like.

The base 305 includes an adjuster 319 configured to allow the user 203 to adjust the length of the walking cane 205 along a vertical axis. It should be appreciated that although the adjuster 319 is shown on the superior end of the shaft 303, it is contemplated that the adjuster 319 could vary in location, size, style, and the like.

It is also contemplated and will be appreciated that the walking cane 205 may incorporate any suitable transmitting system that allows the walking cane 205 to receive and/or transmit communication signal 211 between the walking cane 205 and the remote control device 209.

It should also be appreciated that one of the unique features believed characteristic of the present application is the configuration of the walking cane and the inclusion of the remote control device that allows a user to carry on common daily activities more independently.

Figure 4:
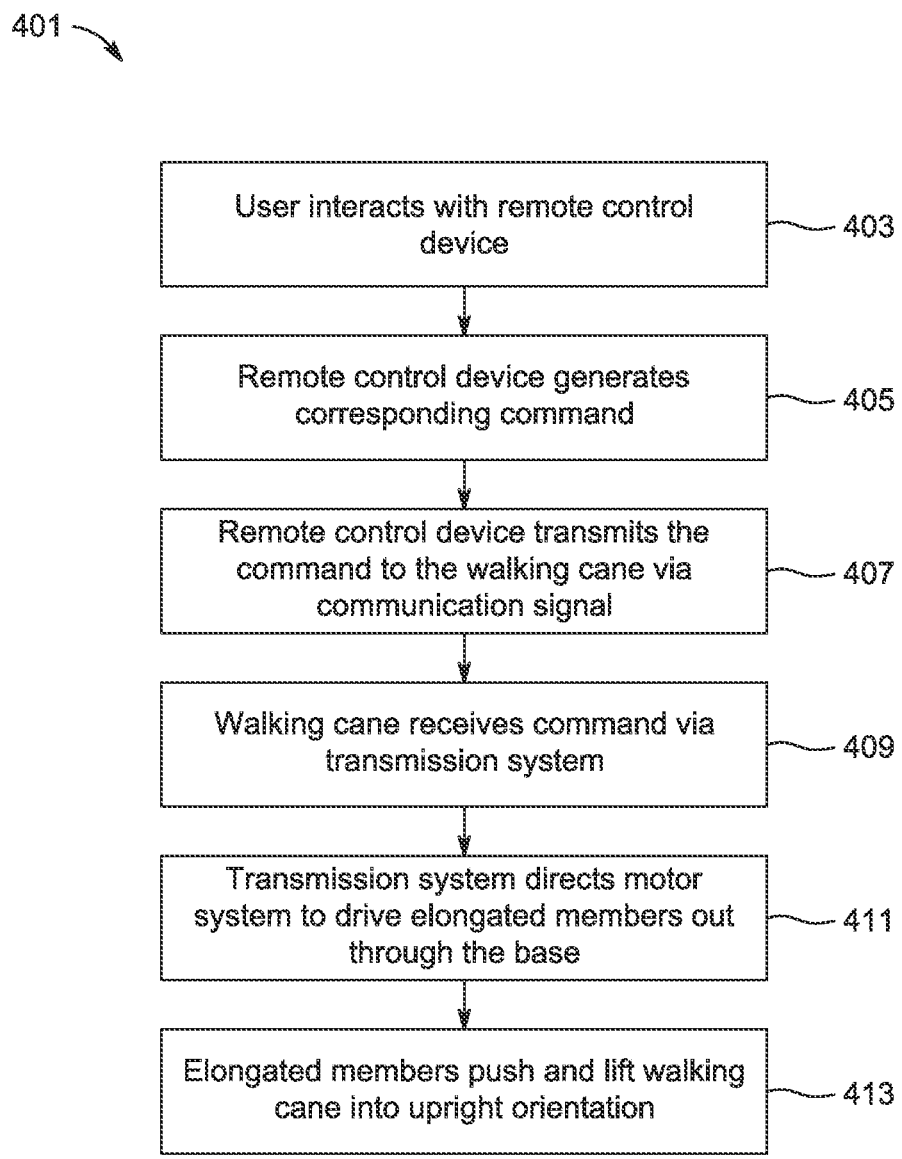
FIG. 4 is a flowchart of a method of use of the system of FIG. 2.

In FIG. 4, a flowchart 401 depicts a simplified method of use associated with system 101. During use, the user interacts with the remote control device and the remote control device generates a corresponding command, as shown with boxes 403, 405. The remote control device transmits the command to the walking cane via a communication signal, as shown with box 407. The walking cane receives the command via a transmission system, upon which the transmission system directs the motor system to drive the elongated members out through the base, as shown with boxes 409, 411. The elongated members push and lift the walking cane into an upright orientation, as shown with box 413.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A walking cane system, comprising:
   a remote control device, the remote control device having:
   a user interface configured to receive user input; and
   a first transmission system; and
   a walking cane, the walking cane having:
      a shaft configured with a proximal end and a distal end;
      a handle coupled to the proximal end of the shaft;
      a base coupled to the distal end of the shaft;
      one or more elongated members housed within the shaft;
      one or more elasticized cords;
      one or more return springs;
      an adjuster;
      a second transmission system;
      a power box; and
      a motor system;
   wherein the one or more elongated members are configured to push and lift the walking cane into a vertical orientation;
   wherein the elasticized cords and the return springs are in communication with the elongated members to move the elongated members;
   wherein the adjuster is configured to adjust the length of the walking cane along a vertical axis;
   wherein the power box is configured to supply and control electrical power within the walking cane; and
   wherein the motor system is configured to drive the elongated members out of the shaft and through the base;
   wherein the first transmission system is configured to generate one or more signals based on user input and transmit said one or more signals to the second transmission system;
   wherein the second transmission system is configured to receive one or more signals from the first transmission system; and wherein the second transmission system is configured to activate the motor system based on the one or more signals received from the first transmission system.

2. A walking cane, comprising:
a shaft configured with a proximal end and a distal end;
a handle coupled to the proximal end of the shaft;
a base coupled to the distal end of the shaft;
one or more elongated members housed within the shaft;
one or more elasticized cords;
one or more return springs;
an adjuster;
a transmission system;
a power box; and
a motor system;
wherein the one or more elongated members are configured to push and lift the walking cane into a vertical orientation;
wherein the elasticized cords and the return springs are in communication with the elongated members to move the elongated members;
wherein the adjuster is configured to adjust the length of the walking cane along a vertical axis;
wherein the power box is configured to supply and control electrical power within the walking cane;
wherein the motor system is configured to drive the elongated members out of the shaft and through the base; and
wherein the transmission system is configured to activate the motor system based on the receipt of one or more signals.

* * * * *